(12) United States Patent
Shim et al.

(10) Patent No.: US 8,438,651 B2
(45) Date of Patent: May 7, 2013

(54) DATA REPRODUCING METHOD, DATA RECORDING/ REPRODUCING APPARATUS AND DATA TRANSMITTING METHOD

(75) Inventors: Young Sun Shim, Seoul (KR); Byung Jin Kim, Seongnam-si (KR); Jea Yong Yoo, Seoul (KR)

(73) Assignee: LG Electronics Inc., Seoul (KR)

( * ) Notice: Subject to any disclaimer, the term of this patent is extended or adjusted under 35 U.S.C. 154(b) by 1949 days.

(21) Appl. No.: 11/392,737

(22) Filed: Mar. 30, 2006

(65) Prior Publication Data

US 2007/0186286 A1    Aug. 9, 2007

Related U.S. Application Data

(60) Provisional application No. 60/668,974, filed on Apr. 7, 2005.

(30) Foreign Application Priority Data

Feb. 9, 2006  (KR) .......................... 10-2006-0012639

(51) Int. Cl.
*H04L 29/06* (2006.01)

(52) U.S. Cl.
USPC ............................................ 726/27; 713/193

(58) Field of Classification Search .................. 713/193; 726/26, 27
See application file for complete search history.

(56) References Cited

U.S. PATENT DOCUMENTS

| 5,563,715 | A | * | 10/1996 | Sato et al. ...................... 386/225 |
| 5,926,624 | A | * | 7/1999 | Katz et al. ...................... 709/217 |
| 6,560,651 | B2 | * | 5/2003 | Katz et al. ...................... 709/229 |
| 7,222,183 | B2 | * | 5/2007 | Juszkiewicz .................. 709/231 |
| 7,249,147 | B2 | * | 7/2007 | Juszkiewicz ............... 369/30.06 |
| 7,447,314 | B2 | * | 11/2008 | Hayashi ........................ 380/210 |
| 7,509,178 | B2 | * | 3/2009 | Logan et al. ..................... 700/94 |
| 7,617,402 | B2 | * | 11/2009 | Shibata et al. ................ 713/193 |
| 7,630,497 | B2 | * | 12/2009 | Lotspiech et al. ............ 380/277 |
| 2002/0091799 | A1 | * | 7/2002 | Katz et al. ...................... 709/219 |
| 2002/0107941 | A1 | * | 8/2002 | Katz et al. ...................... 709/219 |
| 2002/0162104 | A1 | * | 10/2002 | Raike et al. ..................... 725/31 |
| 2003/0140114 | A1 | * | 7/2003 | Katz et al. ...................... 709/217 |
| 2004/0076294 | A1 | * | 4/2004 | Shibata et al. ................ 380/201 |
| 2004/0116186 | A1 | * | 6/2004 | Shim et al. ...................... 463/42 |
| 2004/0122773 | A1 | * | 6/2004 | McCombs et al. ............. 705/52 |

(Continued)

FOREIGN PATENT DOCUMENTS

| CN | 1263305 | 8/2000 |
| CN | 1397896 A | 2/2003 |

OTHER PUBLICATIONS

Office Action issued Jul. 10, 2009 by the Chinese Patent Office in counterpart Chinese Patent Application No. 200610071850.6 (English translation).

*Primary Examiner* — David Garcia Cervetti
(74) *Attorney, Agent, or Firm* — Harness, Dickey & Pierce (57) ABSTRACT

A data reproducing method, data recording/reproducing apparatus and data transmitting method are disclosed. The present invention includes the steps of providing information for identifying a player to a server, downloading data based on the information from the server and reproducing the data. And, the present invention includes the steps of receiving information for identifying a player from the player, configuring data using the information, and transmitting the data to the player. Accordingly, content can be protected against illegal copy, illegal distribution and the like by employing player information. And, the present invention can trace a player having compromised content.

9 Claims, 8 Drawing Sheets

U.S. PATENT DOCUMENTS

| | | |
|---|---|---|
| 2004/0151312 A1* | 8/2004 | Yanagisawa .................... 380/45 |
| 2004/0151324 A1* | 8/2004 | Furukawa et al. ............ 380/281 |
| 2004/0156509 A1* | 8/2004 | Nakano et al. ................. 380/281 |
| 2004/0190868 A1* | 9/2004 | Nakano et al. ................. 386/94 |
| 2004/0193874 A1* | 9/2004 | Kanazawa et al. ............ 713/161 |
| 2004/0199534 A1* | 10/2004 | Juszkiewicz .................. 707/101 |
| 2004/0218900 A1* | 11/2004 | Yoon et al. ...................... 386/46 |
| 2004/0243814 A1* | 12/2004 | Nakano et al. ................. 713/189 |
| 2004/0246863 A1* | 12/2004 | Ando et al. ................. 369/59.22 |
| 2005/0010616 A1 | 1/2005 | Burks |
| 2005/0021941 A1* | 1/2005 | Ohmori et al. ................. 713/156 |
| 2005/0027994 A1* | 2/2005 | Sai ................................ 713/189 |
| 2005/0039207 A1* | 2/2005 | Park et al. ....................... 725/40 |
| 2005/0065890 A1* | 3/2005 | Benaloh ........................... 705/51 |
| 2005/0078825 A1* | 4/2005 | Ohmori et al. ................. 380/255 |
| 2005/0091491 A1* | 4/2005 | Lee et al. ....................... 713/167 |
| 2005/0094813 A1* | 5/2005 | Benaloh ........................ 380/239 |
| 2005/0097062 A1* | 5/2005 | Benaloh ........................... 705/71 |
| 2005/0097063 A1* | 5/2005 | Benaloh ........................... 705/71 |
| 2005/0152682 A1* | 7/2005 | Kang et al. ..................... 386/95 |
| 2005/0190916 A1* | 9/2005 | Sedacca ........................ 380/239 |
| 2005/0195975 A1* | 9/2005 | Kawakita ........................ 380/30 |
| 2005/0226416 A1* | 10/2005 | Jung et al. ..................... 380/228 |
| 2005/0273862 A1* | 12/2005 | Benaloh et al. .................. 726/26 |
| 2006/0036549 A1* | 2/2006 | Wu ................................ 705/51 |
| 2006/0059573 A1* | 3/2006 | Jung et al. ........................ 726/31 |
| 2006/0074985 A1* | 4/2006 | Wolfish et al. ............. 707/104.1 |
| 2006/0101524 A1* | 5/2006 | Weber ............................. 726/27 |
| 2006/0150251 A1* | 7/2006 | Takashima et al. ............. 726/26 |
| 2006/0153535 A1* | 7/2006 | Chun et al. ...................... 386/95 |
| 2006/0156010 A1* | 7/2006 | Kim ............................. 713/176 |
| 2006/0193474 A1* | 8/2006 | Fransdonk ..................... 380/279 |
| 2006/0199644 A1* | 9/2006 | Hirota ............................. 463/42 |
| 2006/0210084 A1* | 9/2006 | Fransdonk ..................... 380/278 |
| 2006/0233361 A1* | 10/2006 | Hasegawa et al. .............. 380/42 |
| 2006/0248595 A1* | 11/2006 | Kelly et al. ..................... 726/27 |
| 2006/0277582 A1* | 12/2006 | Kiiskinen et al. ............... 725/89 |
| 2007/0011730 A1* | 1/2007 | Hamano et al. ................... 726/9 |
| 2007/0050849 A1* | 3/2007 | Takashima ...................... 726/26 |
| 2007/0067242 A1* | 3/2007 | Lotspiech et al. .............. 705/57 |
| 2007/0067244 A1* | 3/2007 | Jin et al. .......................... 705/59 |
| 2007/0136240 A1* | 6/2007 | Wang et al. ....................... 707/3 |
| 2007/0274180 A1* | 11/2007 | Kato et al. ................. 369/47.16 |
| 2008/0141069 A1* | 6/2008 | Iwamura ......................... 714/14 |
| 2008/0285744 A1* | 11/2008 | Gorissen et al. ................ 380/29 |

* cited by examiner

|  | Name | Meaning |
|---|---|---|
| 0 | Interactive Graphics | Interactive Graphics Stream Number |
| 1 | Audio | Audio Stream Number |
| 2 | Presentation graphics and Text subtitle | Presentation graphics and Text subtitle stream number |
| 3 | Angle | Angle Number |
| ... | ... | ... |
| 32 | Player ID | Player Identification — 501 |
| 33 | - | - |
| ... | ... | ... |

FIG. 5B

| b31 | b30 | b29 | b28 | b27 | b26 | b25 | b24 |
|---|---|---|---|---|---|---|---|
| reserved | | | | | | | |
| b23 | b22 | b21 | b20 | b19 | b18 | b17 | b16 |
| reserved | | | | | | | |
| b15 | b14 | b13 | b12 | b11 | b10 | b9 | b8 |
| reserved | | | | | | | |
| b7 | b6 | b5 | b4 | b3 | b2 | b1 | b0 |
| Player_ID | | | | | | | |

DATA REPRODUCING METHOD, DATA RECORDING/ REPRODUCING APPARATUS AND DATA TRANSMITTING METHOD

This application claims the benefit of the Korean Patent Application No. 10-2006-0012639, filed on Feb. 9, 2006, which is hereby incorporated by reference as if fully set forth herein.

This application claims the benefit of the U.S. Provisional Application No. 60/668,974, filed on Apr. 7, 2005, in the name of inventors Young Sun SHIM, Byung Jin KIM and Jea Yong YOO, entitled "SEQUENCE KEY RULE FOR ONLINE CONTENT", which is hereby incorporated by reference as if fully set forth herein.

BACKGROUND OF THE INVENTION

1. Field of the Invention

The present invention relates to a reproduction of data provided by a content provider, and more particularly, to a data reproducing method, data recording/reproducing apparatus and data transmitting method.

2. Discussion of the Related Art

Generally, optical discs capable of recording large-scale data are widely used as recording media. Recently, a new high-density recording medium, e.g., Blu-ray disc (hereinafter abbreviated BD) has been developed to store video data of high image quality and audio data of high sound quality for long duration.

The high-density recording medium as a next generation recording medium technology is a next generation optical record solution provided with data remarkably surpassing that of a conventional DVD. And, many efforts are made to research and develop the BD together with other digital devices.

However, in reproducing external input signals and the high-density recording medium, since a preferable method of protecting content provided by a content provider has not been proposed or developed, many limitations are put on the development of a full-scale optical player despite the initiation of developing an optical player adopting high-density recording medium specifications.

SUMMARY OF THE INVENTION

Accordingly, the present invention is directed to a data reproducing method, data recording/reproducing apparatus and data transmitting method that substantially obviate one or more problems due to limitations and disadvantages of the related art.

An object of the present invention is to provide a data reproducing method, data recording/reproducing apparatus and data transmitting method, by which content provided by an authorized content provider can be protected against illegal copy, illegal distribution and the like.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of reproducing data according to the present invention includes the steps of providing information for identifying a player to a server data, downloading the data based on the information from the server and reproducing the data.

Besides, the information can be stored in a memory unit within the player.

Besides, the memory unit can be a 'Player Status Register (PSR)'.

Besides, the data can be configured to be reproducible using 'device keys' of the player.

Besides, the data can be configured to be reproducible using 'sequence keys' of the player.

In another aspect of the present invention, a data recording/reproducing apparatus includes a storage device storing downloaded data, a memory unit storing information for identifying the apparatus, and a controller providing the information to a server, the controller downloading data configured using the information from the server.

Besides, the memory unit can be a 'Player Status Register (PSR)'.

Besides, the data can be configured to be reproducible using 'device keys' of the player.

Besides, the data can be configured to be reproducible using 'sequence keys' of the player.

In another aspect of the present invention, a method of transmitting data includes the steps of receiving information for identifying a player from the player, configuring data using the information, and transmitting the data to the player.

Besides, the information can be stored in a memory unit within the player.

Besides, the memory unit can be 'Player Status Register (PSR)'.

Besides, the data can be configured reproducible using 'device keys' of the player.

Besides, the data can be configured reproducible using 'sequence keys' of the player.

In another aspect of the present invention, a data recording/reproducing apparatus includes a memory unit wherein information for identifying the apparatus is stored in the memory unit.

Besides, the memory unit can be a 'Player Status Register (PSR)'.

By a present invention, in case that content is provided via network, the content can be selectively offered according to a player. And, a tracking of a player having damaged the provided content is enabled to protect the content provider and an authentic user.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, for convenience of explanation, the present invention takes an optical disc, and more particularly, "Blu-ray disc (BD)" as an example of a recording medium. Yet, it is apparent that the technical idea of the present invention may be applicable to other recording media such as HD-DVD and the like.

In the present invention, the term "storage" means an element in which a user can randomly store necessary information and data to utilize. In particular, a storage, which is currently used in general, includes "hard disc", "system memory", "flash memory" or the like, which does not put limitation on the scope of the present invention.

Specifically, the "storage" is utilized for storing data associated with a recording medium (e.g., Blu-ray disc). The data associated with the recording medium to be stored within the storage generally includes downloaded data from an external source.

Besides, it is apparent that a permitted data directly read out of a recording medium in part or a generated system data (e.g., metadata, etc.) associated with record/reproduction of the recording medium can be stored within the storage.

For convenience of explanation of the present invention, the data recorded within the recording medium is named "original data" and the data stored within the storage is named "additional data". Wherein the data stored within the storage is data associated with the recording medium.

In the present invention, "title" is a reproduction unit configuring an interface with a user. Each title is linked to a specific object. And, a stream associated with the corresponding title recorded within a disc is reproduced according to a command or program within the object. In particular, a title having moving a picture or interactive information according to MPEG2 compression among titles recorded within a disc is named an "HDMV Title". And, a title having a moving picture or interactive information executed by a Java program among titles recorded within a disc is named "BD-J Title".

Figure 1:
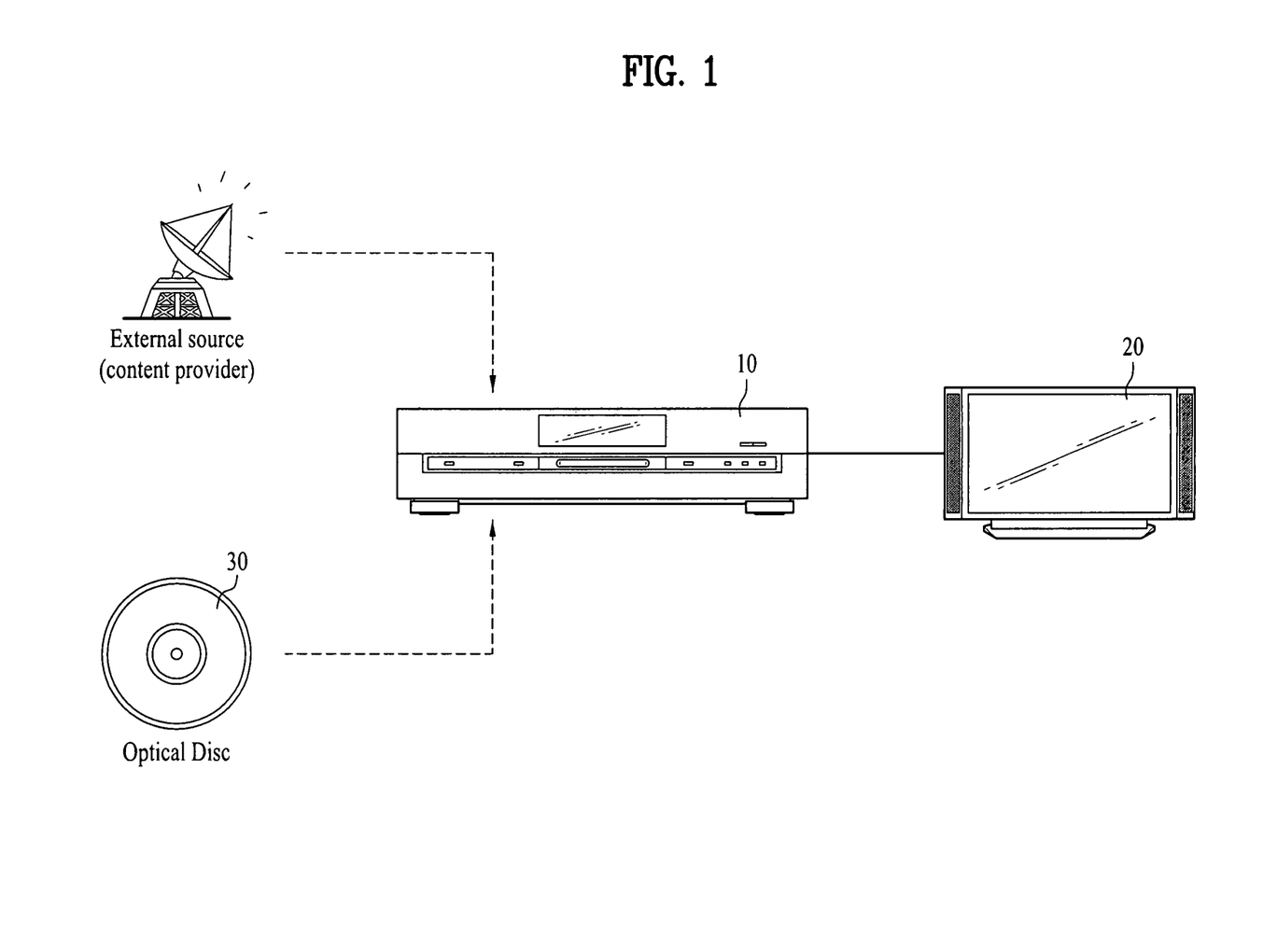
FIG. 1 is a diagram illustrating a data recording and reproduction system according to the present invention.

FIG. 1 is an exemplary diagram illustrating an overall system for recording and/or reproducing data between a player 10 and peripheral devices consistent with the present invention.

Referring to FIG. 1, a "recording/reproducing apparatus (10)" according to the present invention enables a recording or playback of data for an optical disc. In the following description of the present invention, by considering interactivity between an optical disc and a peripheral device to be solved by the present invention, an optical disc player playing back an optical disc or an optical disc recorder recording and reproducing data on an optical disc will be taken as an example.

The recording/reproducing apparatus 10 receives an external input signal from an external source, performs signal-processing on the received signal, and delivers a corresponding image to a user via another external display 20 based, in part, on the external input signal. A DMB (digital multimedia broadcast) signal, an Internet signal or the like are representative of the external input signals. In case of the Internet, a specific data on Internet can be downloaded via the recording/reproducing apparatus 10 to be utilized.

A party, who provides content as an external source, is generically referenced as a "content provider (CP)".

Specifically, the object of the present invention is to protect the content from illegal copying, illegal distribution and the like. Further, even if illegally copied content is distributed, the present invention provides a method and apparatus for tracking down a player having performed the illegal copy and distribution of content.

The original data and the additional data will be explained in detail as follows. For instance, if a multiplexed AV stream for a specific title is recorded as an original data within an optical disc and if an audio stream (e.g., English) different from the audio stream (e.g., Korean) of the original data is provided as an additional data on the Internet, a request for downloading the audio stream (e.g., English) as the additional data on Internet to reproduce together with the AV stream of the original data or a request for downloading the audio stream (e.g., English) as the additional data on Internet to reproduce only will exist according to a user. To enable the requests, association between the original data and the additional data needs to be regulated and a systematic method of managing/reproducing the data according to the user's request is needed.

For convenience of explanation in the above description, additional data may include any signal existing outside the disc. Namely, data having any kind of attribute, which exists outside the optical disc and is associated with the original data, can become the additional data. Moreover, the additional data can be individually downloaded per index file (index), PlayList file (*.m2ts) or clip information file (*.clpi). Besides, the additional data can be downloaded by content unit or by title unit.

To realize a user's requests, it is essential to provide a file structure between the original data and the additional data. File and data record structures usable for an optical disc are explained in detail with reference to FIG. 2 as follows.

Figure 2:
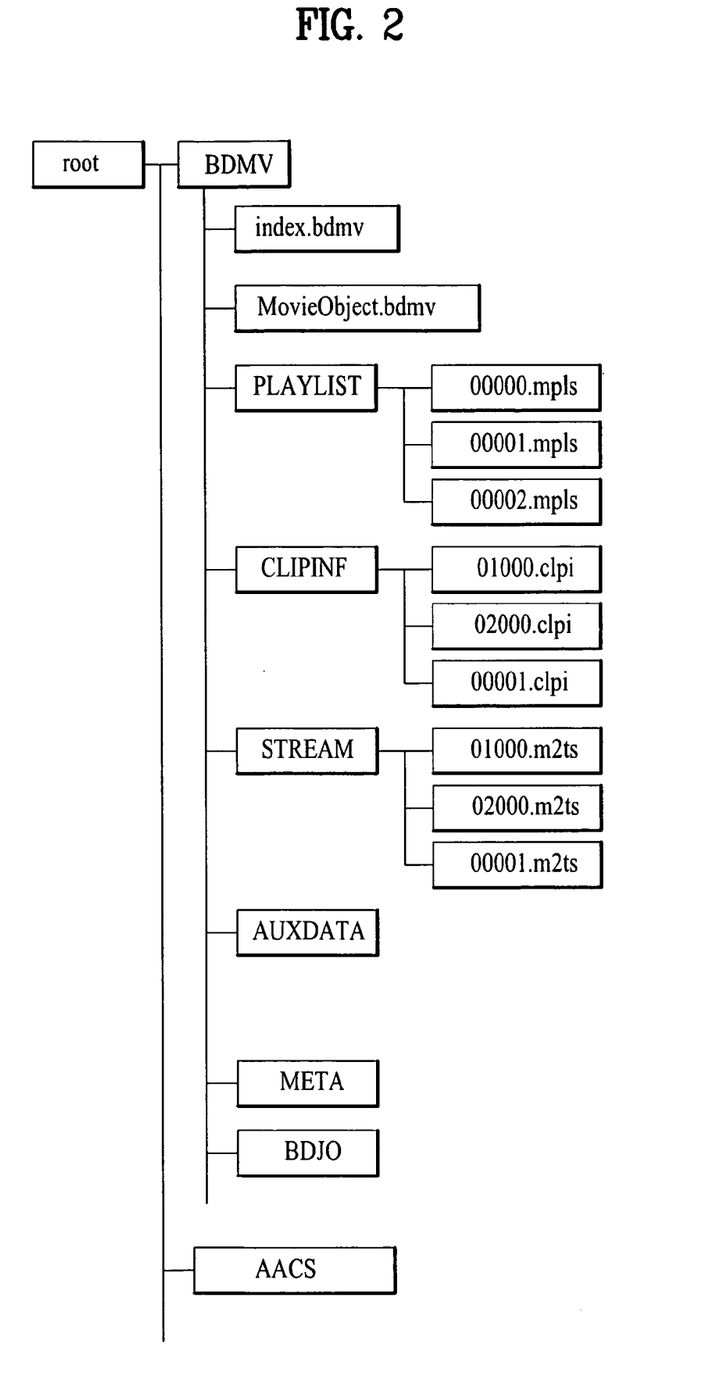
FIG. 2 is a diagram of a data file structure of the present invention.

FIG. 2 is a diagram of a data file structure of the present invention.

Referring to FIG. 2, in a file structure of the present invention, an AACS directory (AACS) and at least one BDMV directory (BDMV) exist below one root directory. An index file ("index") and an object file ("MovieObject") as general file (higher file) information to secure interactivity with a user exist within the BDMV directory. And, the BDMV directory, which has information of data actually recorded within a disc and information about reproducing the recorded data information, is provided with a PLAYLIST directory (PLAYLIST), CLIPINF directory (CLIPINF), STREAM directory (STREAM), auxiliary directory (AUXDATA), BD-J object directory (BDJO) and the like. The directories and files included in each of the directories are explained in detail as follows.

The metadata directory (META) includes a metadata file. The metadata directory includes a search file, a metadata file for a Disc Library and the like, for example.

The BD-J Object directory (BDJO) includes a BD-J Object file for reproducing a BD-J Title.

The auxiliary directory (AUXDATA) includes an auxiliary data file necessary for a disc playback. For instance, the auxiliary directory (AUXDATA) includes a sound file ("Sound.bdmv") providing sound in interactive graphic execution, a file ("1111.otf") providing font information in disc playback, etc.

In the stream directory (STREAM), files for AV streams are recorded within a disc in a specific format. Each of the streams is generally recorded as MPEG-2 transport packets. And, ".m2ts" is used as an extension of a stream file (01000.m2ts, 02000.m2ts). In particular, a stream having multiplexed video/audio/graphic information among the streams is named AV stream. And, at least one or more AV stream files configure a title.

The clipinfo directory (CLIPINF) includes clip information files (01000.clpi, 02000.clpi) corresponding to the stream files by one-to-one, respectively. In particular, the clip information file (*.clpi) includes attribute information and timing information of the corresponding stream file ("*.clpi"). In particular, the clip information file (*.clpi) corresponding to the stream file (*.m2ts) by one-to-one are bound together to be named "clip". Namely, "clip" becomes data including stream file ("*.m2ts") and clip information file ("*.clpi").

The playlist directory (PLAYLIST) includes PlayList files ("*.mpls"). Each of the PlayList files ("*.mpls") includes at least one PlayItem (PI) designating a playing interval of a specific clip and a SubPlayItem (SPI). The PlayItem (PI) and SubPlayItem (SPI) have information about a reproduction start time (IN-Time) and reproduction end time (OUT-Time) of a specific clip to be reproduced.

A process of reproduction performed by at least one PlayItem (PI) within a playlist file is defined as a "main path" and a process of reproduction performed by each SubPlayItem (SPI) is defined as a "sub path". The main path should exist within the PlayList file. And, at least one sub path exists according to existence of a SubPlayItem (SPI). Therefore, the playlist file becomes a basic reproduction management file unit within an overall reproduction management file structure to perform a reproduction of a specific clip by a combination of at least one or more PlayItems.

The AACS directory (AACS) stores information necessary for data protection. For instance, a key file containing a key enabling a decryption of encrypted data, a certificate file for data within the recording medium and/or storage, a usage file corresponding to an encryption unit of data and the like exist within the AACS directory.

Positions of the above explained files and directories are exemplary. And, it is apparent that the positions can be varied if necessary. Namely, the directories and files are construed not by the names and position but by their meanings.

Figure 3:
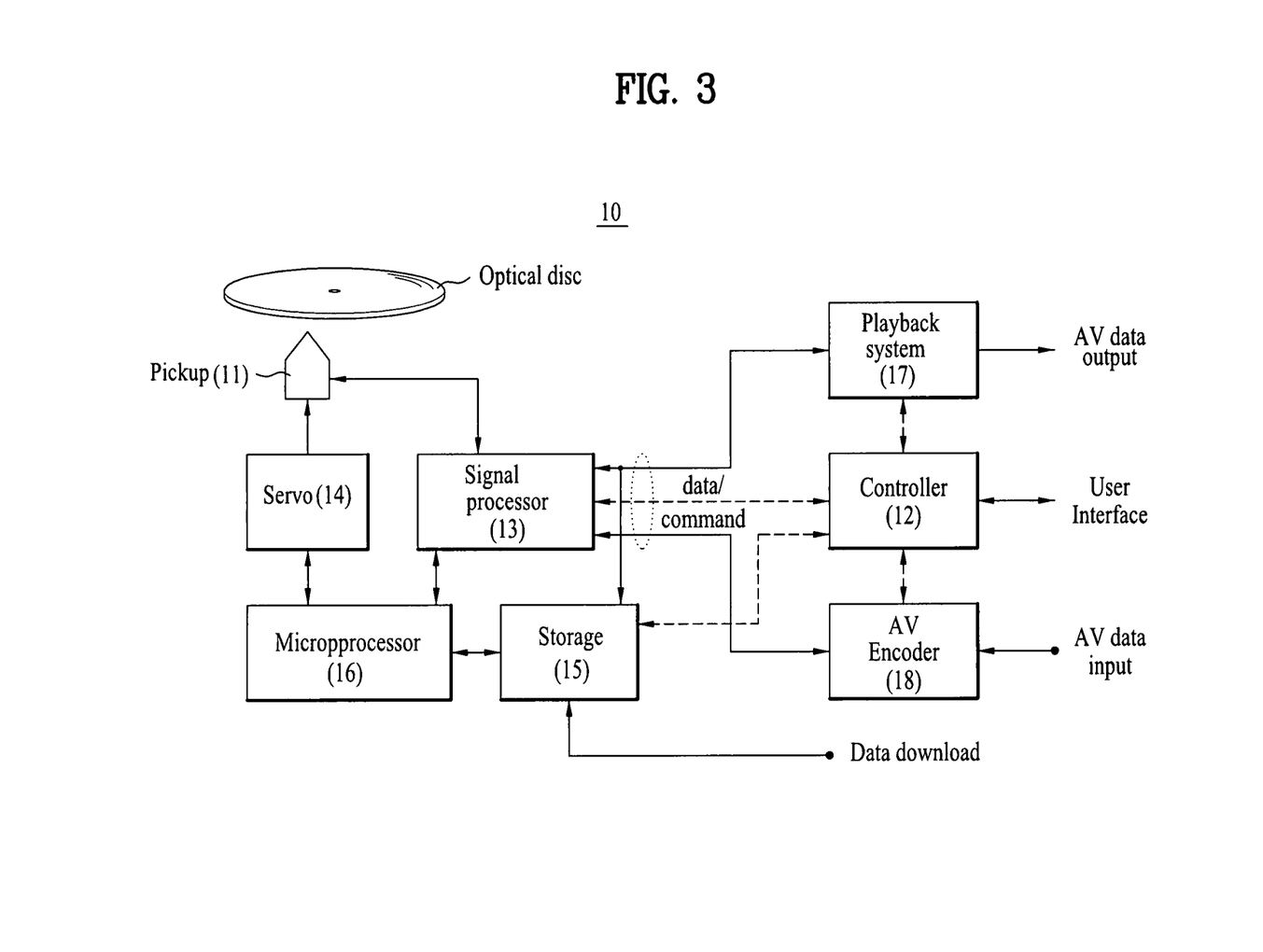
FIG. 3 is a block diagram of a player according to one embodiment of the present invention.

FIG. 3 is a block diagram of a recording/reproducing apparatus 10 according to one embodiment of the present invention.

Referring to FIG. 3, a recording/reproducing apparatus 10 according to one embodiment of the present invention includes a pickup 11 for reproducing information including original data and reproduction management file information recorded in an optical disc, a servo 14 controlling an action of the pickup 11, a signal processor 13 restoring a reproduction signal received from the pickup 11 to a specific signal value, the signal processor 13 modulating a signal to be recorded into a signal recordable on the optical disc, the signal processor 13 delivering the modulated signal, and a microprocessor 16 controlling the overall operations.

Additional data is downloaded by a controller 12 in response to a user command or the like. The controller 12 enables the downloaded additional data to be stored in storage 15 and then provided to the controller 12. The controller 12 then reproduces original data and/or additional data according to a user's request.

A playback system 17 decodes output data to provide to a user under the control of the controller 12. The playback system 17 includes a decoder for decoding an AV signal and player model. The player model decides a reproduction direction by interpreting a user command inputted via the controller 12, an object command or application associated with reproduction of a specific title.

In the present invention, the controller 12 plays a role in providing player information to an external server or including the player information as secret information in the reproduced data. Through this, if content is damaged by illegal copy, illegal distribution or the like, a player having damaged the content can be traced to prohibit the content copy and distribution. The playback system 17 will be explained in detail with reference to FIG. 4.

In order to perform a function of recording a signal in the optical disc, an AV encoder 18 converts an input signal to a signal of a specific format, e.g., an MPEG2 transport stream according to a control of the controller 12 and then provides the converted signal to the signal processor 13.

Figure 4:
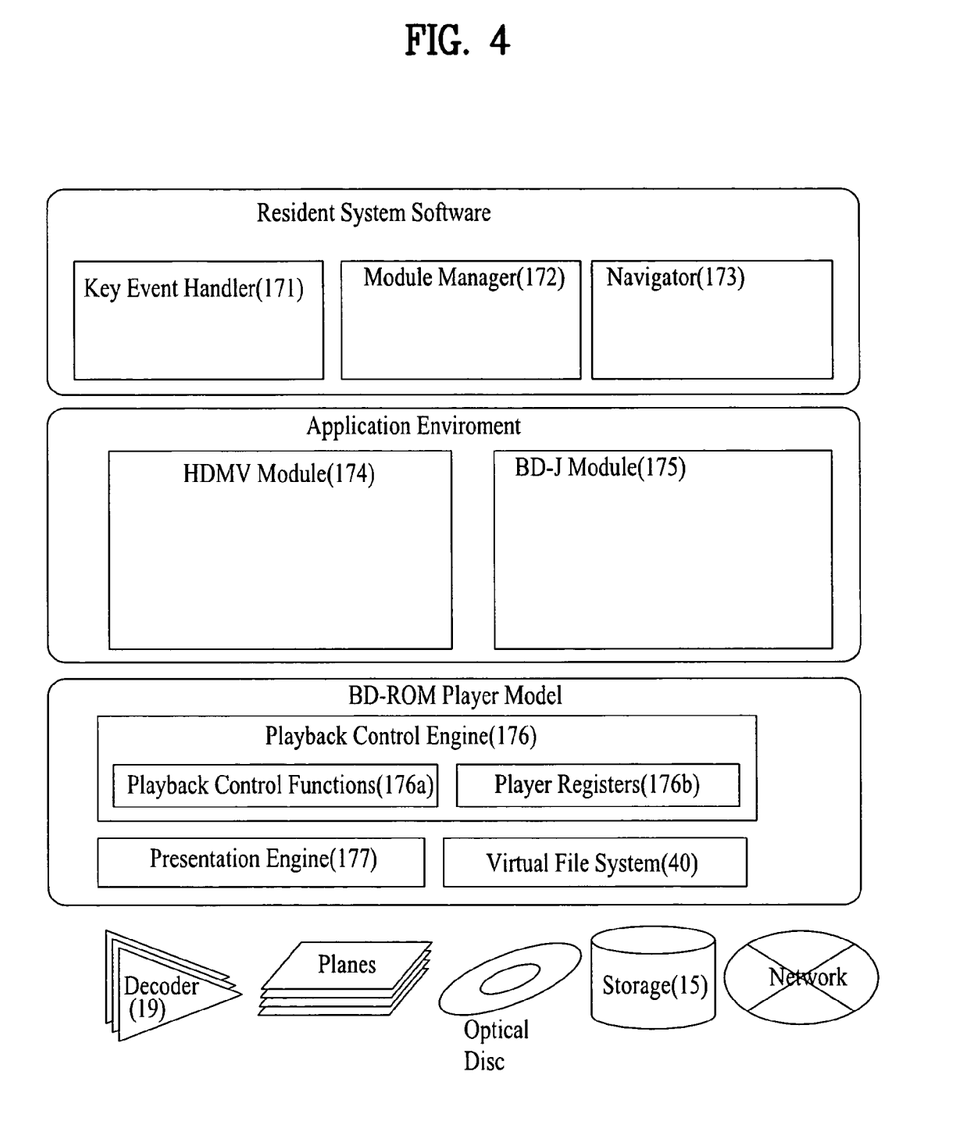
FIG. 4 is a block diagram of a data recording/reproducing apparatus utilizing a playback system of the present invention.

FIG. 4 is a block diagram of a recording medium playback apparatus utilizing a playback system according to one embodiment of the present invention.

First of all, "playback system" includes a collective reproduction processing system constructed with a program (software) and/or hardware provided within an optical player. The playback system plays a recording medium loaded in the optical player and simultaneously reproduces and manages the data that is associated with the recording medium and is stored in a storage (e.g., data downloaded from outside).

Specifically, a playback system 17 includes "Key Event Handler(171)", "Module Manager(172)", "HDMV Module(174)", "BD-J Module(175)", "Playback control engine(176)", "Presentation engine(177)" and "Virtual File System(40)", which is explained in detail as follows. This is explained in detail as follows.

First of all, as separate reproduction processing management for reproducing HDMV Title and BD-J Title, respectively, the "HDMV Module (174)" for HDMV Title and "BD-J Module (175)" for BD-J Title are independently configured. Each of the "HDMV Module (174)" and the "BD-J Module (175)" has a control function for processing a command or program within the aforesaid object (Movie Object or BD-J Object). "Navigator (173)" can perform a title selection at any time under a user's control and can provide title metadata to a user. Each of the "HDMV Module (174)" and the "BD-J Module (175)" separates a command or application from the hardware configuration of the playback system to enable a portability of the command or application.

Moreover, "Module Manager (172)" is provided to deliver a user command to the "HDMV Module (174)" or the "BD-J Module (175)" and to control operation of the "HDMV Module (174)" or the "BD-J Module (175)". The "Playback control Engine (176)", which interprets PlayList file information recorded within a disc according to a reproduction command of the "HDMV Module (174)" or the "BD-J Module (175)" and performs a corresponding reproduction function, is provided. Moreover, "Presentation Engine (177)" for decoding a specific stream reproduced and managed by the "Playback Control Engine (176)" and displaying the decoded stream on a screen is provided. Specifically, the "Playback Control Engine (176)" includes "Playback Control Functions (176a)" actually managing all reproductions and "Player Registers (176b)" storing playback status and environment of the player. In some cases, "Playback Control Functions (176a)" may mean "Playback Control Engine (176)".

In the above-explained playback system of the present invention, the "Module Manager (172)", "HDMV Module (174)", "BD-J Module (175)" and "Playback Control Engine (176)" enable software processings, respectively. Substantially, software processing is more advantageous than a hardware configuration in design. Yet, the "Presentation Engine (177)", decoder 19 and planes are normally associated with hardware. In particular, the elements (e.g., reference numbers 172, 174, 175, 176) processed by software can be configured with a portion of the controller 12. Hence, the configuration of the present invention should be understood by its meaning but is not limited to a hardware configuration or a software configuration.

The recent developments of the Internet and players enabling content reproduction and copying have increased illegal copying and distribution of unauthorized content. Moreover, high-quality content vulnerable to hacking and the like need more protection. So, various methods for protecting content have been proposed. The present invention is characterized in placing information for identifying a player in a specific memory of a player to protect content. In the following description, a playback system of a BD player is explained for example.

Figure 5A:
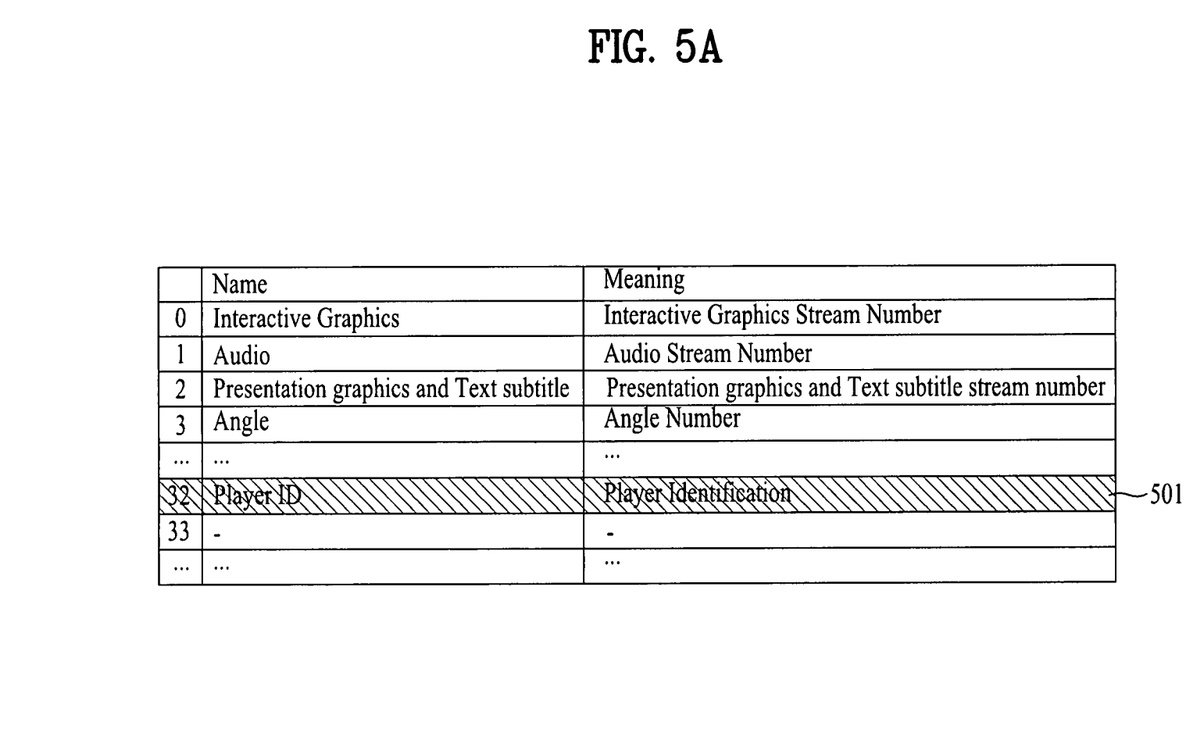
FIG. 5A and FIG. 5B are diagrams of an example of a memory unit provided to a data recording/reproducing apparatus according to the present invention and an example of a memory unit structure, respectively.
Figure 5B:
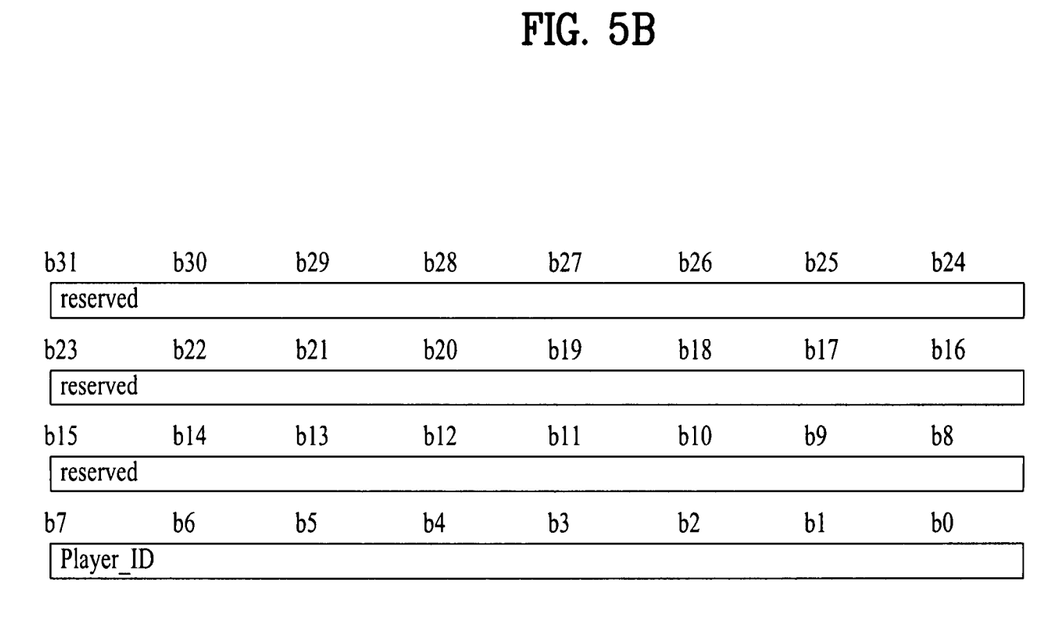

FIG. 5A shows an example of a memory unit provided to a player according to the present invention and FIG. 5B shows an example of a memory unit structure according to the present invention.

"Player Registers (176b)" as illustrated in FIG. 4 is provided as a sort of memory units storing information for record/reproduction status and record/reproduction environment of a player to a BD player. The "Player Registers (176b)" can be classified into 'General Purpose Registers (GPRs)' and 'Player Status Registers (PSRs)'. In FIG. 5A and FIG. 5B, information for identifying a player of the present invention is stored in 'Player Status Register' (hereinafter abbreviated PSR) for example.

Referring to FIG. 5A, 'Player ID' can be stored in one PSR 501 among 'Player Status Registers (PSRs)'. The 'Player ID' is information for identifying a player. In case of transferring data via a network, the 'Player ID' can be used in restricting a distribution of data according to a player. And, the 'Player ID' can be used in tracing a player having reproduced, copied or distributed data without confirmation or authorization. The 'Player ID', as shown in FIG. 5B, is stored using prescribed bits of a PSR 501.

Considering the object of the present invention to protect data provided by a content provider, it is preferable that a player does not allow a user to set a value of the 'Player ID'. So, in case that the 'Player ID' is stored one of 'Player Status Registers', it is preferably stored in a 'Player Setting Register' among 'Playback Status Registers' and 'Player Setting Registers'. This is because the 'Player Setting Registers' are not affected by an initialization process or navigation commands.

In the above example, the information for identifying the player is stored in the 'Player Status Register'. Yet, a memory unit capable of storing information for a player is enough. A player serial number, player manufacturer ID or the like can be used as the information for identifying a player as a 'Player ID'.

A content provider can selectively provide content by checking the player identification information. And, the information can be used in tracing a player having performed an illegal reproduction, copy and leakage of data. This is explained in detail with reference to FIG. 6 as follows.

Figure 6:
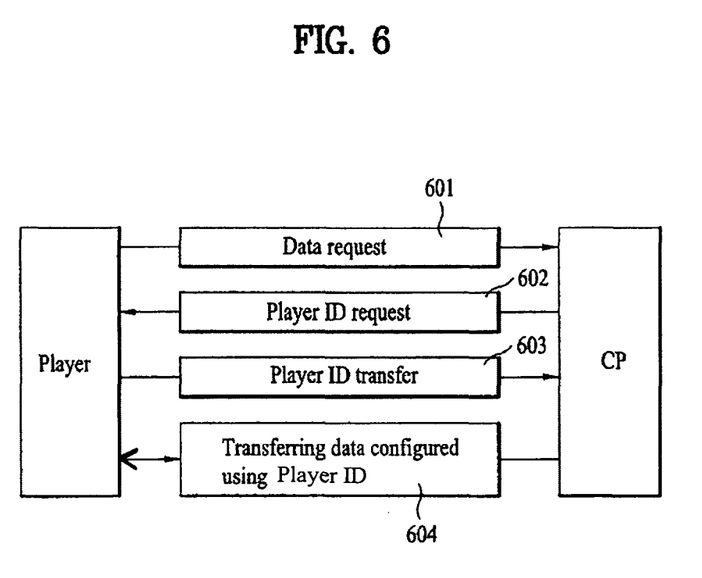
FIG. 6 is a diagram of an example of transmitting data via network according to the present invention.

FIG. 6 is a diagram of an example of transmitting data via a network according to the present invention.

Referring to FIG. 6, a player can download data from a content provider via the network. In case that the player makes a request for data (601) to the content provider (CP) via the network, the content provider can request information for identifying a player, e.g., 'Player ID request' to identify the player (602). In making the request for the data, the player can provide the 'Player ID' by a Player ID transfer 603. Once the player provides the 'Player ID' to the content provider, the content provider decides whether to provide the data to the player. If the 'Player ID' is not credible, the data may not be provided. So, content can be protected by not providing data to the player that is not trusted.

If the player making the request for the data is determined trustworthy, the content provider provides the data to the player (604). In doing so, the 'Player ID' can be used as well. In manufacturing a player, a specific key, e.g., device keys, sequence keys or the like are provided to the player. The device keys and the sequence keys are generated by a trusted authority and are then provided to a player manufacturer. The trusted authority can be AACS (advanced access content system), CPS (content protection system) or another third authority.

The device keys are used in calculating a media key by processing a media key block (MKB). The media key is used in encrypting a decryption key (e.g., 'Title Key', 'CPS Unit Key', etc.) corresponding to encrypted data. The device keys may be either unique per or used in common by a plurality of players. Yet, the device keys are basically provided to each player differently. So, a content provider identifies a player using the provided 'Player ID', encrypts a decryption key with a media key corresponding to device keys provisioned to the player, and then provides the encrypted decryption key to a user. In this case, even if data is provided to a disguised player, the decryption key cannot be decrypted unless there exist device keys corresponding to the data. Hence, it is unable to reproduce the data.

Figure 7:
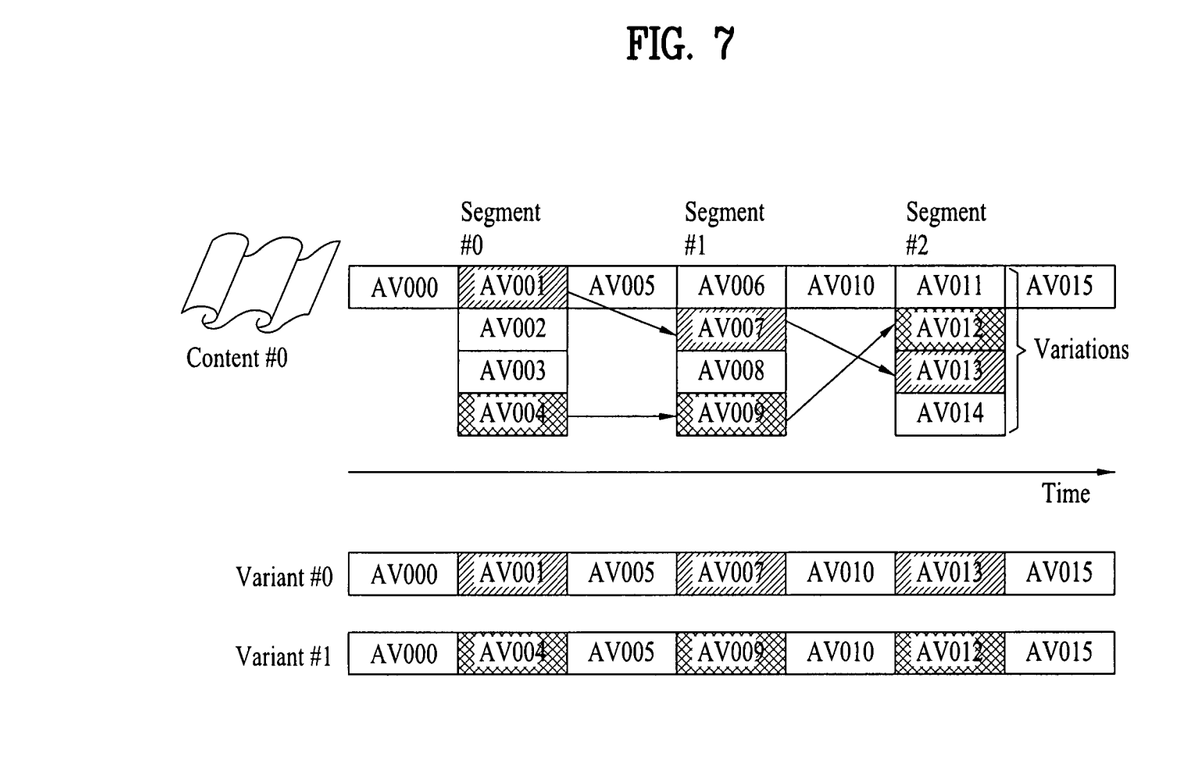
FIG. 7 is a diagram to facilitate conceptional understanding of sequence keys.

FIG. 7 is a diagram to facilitate conceptional understanding of sequence keys.

The sequence keys are introduced to trace a player having performed an illegal copy.

Referring to FIG. 7, a content provider selects several segments (segment #0, segment #1, segment #2) from content #0 and then makes variations for the segments, respectively. Through this, variants for content #0 are generated. A player can decode one variation from each of the segments based on the sequence keys provisioned to the player. Like the device keys, the sequence keys may be either unique per or used in common by a plurality of players. Yet, since the sequence keys are basically provisioned to each player differently, different variants are reproduced according to players, respectively.

Namely, the sequence keys provided to a first player enables 'AV001', 'AV007' and 'AV013' to be reproduced from segment #0, segment #1 and segment #2, respectively. Hence, the first player decodes streams in a sequence of 'AV000', 'AV001', 'AV005', 'AV007', 'AV010' and 'AV013' to generate variant #0. Sequence keys provided to a second player enables 'AV004', 'AV009' and 'AV012' to be reproduced from segments of content #0, respectively. Hence, the different player (a second player) decodes streams in a sequence of 'AV000', 'AV004', 'AV005', 'AV009', 'AV010' and 'AV012' to generate variant #1. Thus, different variants are reproduced according to players in the above-explained manner. A reproduction result of each of the variants is unable to be identified from normal content by a user. Yet, an authority tracing a player can discover a player having reproduced content #0 by identifying a subtle difference between the variants (variants #0, #1, . . . ).

In case a content provider provides data via network, the present invention is characterized in confirming 'Player ID' of a player, configuring streams in a format corresponding to the sequence keys provided to the player and providing the stream to the player. For instance, in case that the first player requests data, variant #0 is provided. In case that the second player requests data, variant #1 is provided. According to the present invention, if content #0 is illegally drained away, i.e., if the content #0 is compromised, a content provider identifies variants by analyzing the content #0 and then calls a player having received the variant to account.

If content is provided in a format corresponding to each sequence keys from a network, the present invention can solve a problem of requiring additional disc capacity by storing segment variations of content in a disc to distribute.

A data recording/reproducing apparatus is explained with reference to FIG. 3 and FIG. 4 as follows.

A data recording/reproducing apparatus 10 according to the present invention is characterized in that information for identifying a player is stored in a memory unit. The memory unit includes 'Player Status Register (PSR)' configuring 'Player Registers' (176b) for example.

The data recording/reproducing apparatus 10 according to the present invention includes storage device 15, a memory unit and a controller 12. Downloaded data is stored in the storage 15 and information for identifying a player is stored in the memory unit. The control unit 12 provides the information for identifying the player to a server and downloads data based on the information.

The memory unit may include 'Player Status Register (PSR)' configuring 'Player Registers' (176b). The downloaded data can be data configured reproducible using 'device keys' provisioned to the player. And, the data can be data configured reproducible using 'sequence keys' provisioned to the player.

Optionally, the information for identifying a player can be used in various ways. For instance, a content provide utilizes the information in requesting a price of content provided by a network to each player differently.

Accordingly, the present invention provides the following effects or advantages. First of all, content can be protected against illegal copy, illegal distribution and the like by employing player information. Secondly, the present invention can trace a player having compromised content by illegal copy, illegal distribution or the like.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of reproducing data stored on a reproducing apparatus, comprising steps of:
    transmitting an identification information of the reproducing apparatus to a content provider, the content provider is an external source providing content data to the reproducing apparatus;
    downloading an encrypted content data based on the identification information to a storage device of the reproducing apparatus from the content provider;
    decrypting the content data by using a decryption key; and reproducing the decrypted content data,
    wherein the content data includes at least one segment configured in a variant stream corresponding to a sequence key, wherein the sequence key is variant information of the content data and unique to the reproducing apparatus.

2. The method of claim 1, wherein the identification information is stored in a memory unit within the reproducing apparatus.

3. The method of claim 2, wherein the memory unit is a Player Status Register (PSR).

4. The method of claim 3, wherein the Player Status Register (PSR) is configured to a Player Setting Register.

5. The method of claim 1, further comprising the steps of:
    downloading the encrypted decryption key from the content provider,
    decrypting the decryption key by using a device key, the device key is a unique key to the reproducing apparatus and provisioned to the reproducing apparatus.

6. A data reproducing apparatus comprising;
    a storage device configured to store a downloaded content data;
    a memory unit configured to store an identification information of the apparatus; and
    a controller configured to:
    transmit the identification information of the apparatus to a content provider, the content provider is an external source providing the content data to the apparatus,
    download an encrypted content data based on the identification information from the content provider,
    decrypt the content data by using a decryption key, and reproduce the decrypted content data,
    wherein the content data includes at least one segment configured in a variant stream corresponding to a sequence key,
    wherein the sequence key is variant information of the content data and unique to the apparatus.

7. The apparatus of claim 6, wherein the memory unit is a Player Status Register (PSR).

8. The apparatus of claim 7, wherein the Player Status Register (PSR) is configured to a Player Setting Register.

9. The apparatus of claim 6, wherein the controller is configured to:
    download the encrypted decryption key used to decrypt the content data from the content provider content,
    decrypting the decryption key by using a device key, the device key is a unique key to the apparatus and provisioned to the apparatus.

* * * * *